Figure 1:
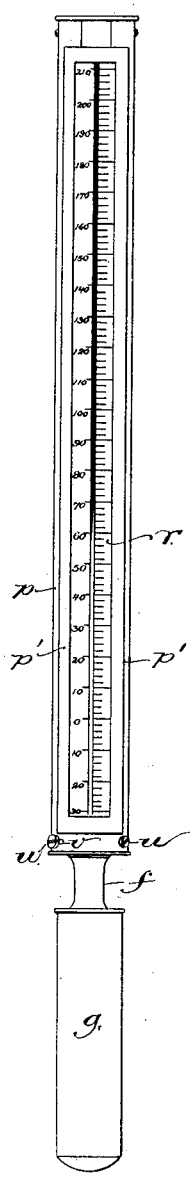

(No Model.)

G. B. ST. JOHN.
INDICATING DEVICE FOR SENSITIVE INSTRUMENTS.

No. 329,237. Patented Oct. 27, 1885.

Witnesses.
John F. C. Prindlert
John F. Nelson

Inventor.
George B. St. John
by Crosby & Gregory attys.

UNITED STATES PATENT OFFICE.

GEORGE B. ST. JOHN, OF BOSTON, MASSACHUSETTS.

INDICATING DEVICE FOR SENSITIVE INSTRUMENTS.

SPECIFICATION forming part of Letters Patent No. 329,237, dated October 27, 1885.

Application filed January 8, 1885. Serial No. 152,306. (No model.)

*To all whom it may concern:*

Be it known that I, GEORGE B. ST. JOHN, of Boston, county of Suffolk, State of Massachusetts, have invented an Improvement in Indicating Devices for Sensitive Instruments, of which the following description, in connection with the accompanying drawings, is a specification—like letters on the drawings representing like parts.

My invention, relating to an indicating device for sensitive instruments, is shown embodied in a thermometer of that class in which the expansion and contraction of a solid produces mechanical movement of the indicating device. In thermometers of this class, as well as in certain classes of barometers or pressure-gages, and various other instruments for indicating changes of condition, the movement of the sensitive or actuating portion has usually been multiplied and indicated by a pointer co-operating with a circular dial. In some cases it is desirable to give an instrument of this class an indicating device co-operating with a rectilinear series of graduations, such as employed in the usual mercurial thermometers and barometers; and the object of the present invention is to provide an instrument containing a sensitive portion with an indicating device co-operating with a substantially rectilinear scale or series of graduations. The indicating device consists of a line or edge intersecting another line or edge at an acute angle, one of these lines having a lateral movement, produced by the sensitive device, relative to the other, by which the point of intersection of the lines is caused to travel rapidly along the same, one of the said lines or edges being graduated to indicate the movement and the position of the point of intersection, by which the condition indicated by the instrument is read or observed.

The indicating device in this instrument consists of a line on the surface of a cylinder separating differently-colored portions of the surface thereof, the said cylinder operating within another cylinder having a longitudinal slot, one edge of which is provided with graduations, the line or edge of the colored portion of the cylinder appearing through the said slot, and its intersection with the graduated edge thereof indicating the temperature or other condition that the instrument is to indicate. The indicating-cylinder, as shown in this instance, is actuated by a spiral lamina or bimetallic strip fastened at one end, and connected at its other end with the spindle or arbor of the said indicating-cylinder; and the invention further consists in details of construction of the devices for fastening the end of the strip, and for adjusting the indicating device relative to the co-operating graduated scale, and in other details of construction.

Figure 2:
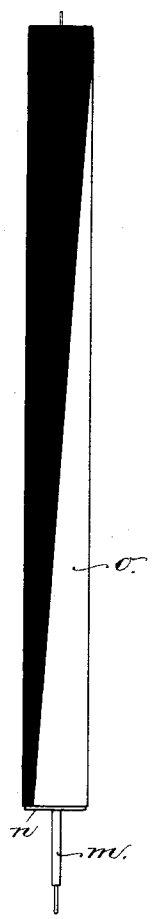
Figure 3:
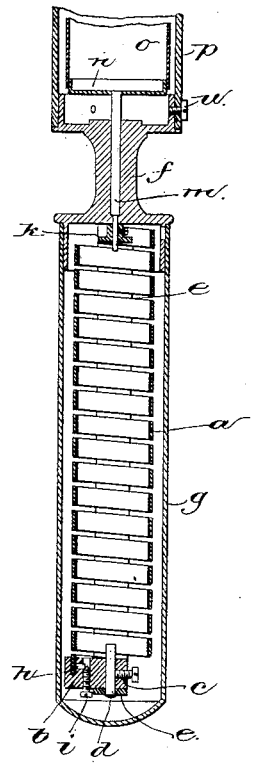

Figure 1 is a front elevation of a thermometer embodying this invention. Fig. 2 is an elevation of the indicating device detached; Fig. 3, a longitudinal section of the sensitive device and its inclosing-case and connected parts, on a larger scale; and Fig. 4, a transverse section of the thermometer on a plane through the indicating-cylinder at right angles to the axis thereof, looking downward, on the same scale as Fig. 3.

The sensitive actuating device $a$ is shown in this instance as a spiral strip or lamina composed of metals—such as brass and iron—which have a different rate of expansion by heat, and thus produce a rotary or twisting movement of one end of the strip with relation to the other when its temperature is changed, which movement is made use of to actuate an indicating device, and thus indicate the changes in temperature that the sensitive device $a$ is exposed to.

Figure 4:
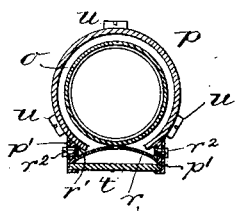

In order that the twisting of one end of the strip relative to the other may be made effective, one end (shown in Fig. 3 as the lower end) is held stationary with relation to the remainder of the apparatus, it being shown as passing through a notch in a block, $b$, held by a screw or clamping device, $c$, on a pin, $d$, connected with a frame, $e$, itself connected with a piece, $f$, constituting the base of the indicating portion of the instrument. A case, $g$, fastened to the base $f$, incloses and protects the sensitive device $a$ and connected parts. The lower end of the strip $a$, when its length is properly adjusted, as will be hereinafter more fully described, is made fast in the notch of the block $b$ by a pin, $h$, extending from the said notch into the hole of a screw, $i$, having a tapering point which bears upon the pin $h$ as the said screw is turned into its hole, thereby causing the latter to bind on the strip and make it fast in the notch. The other end of the strip $a$ is connected with an arm, $k$, fixed upon a spindle, $m$, having a bearing in the base-piece $f$, so that the twisting of the strip $a$ as it expands and contracts causes the said arbor $m$ to turn in the said base-piece $f$. The arbor $m$ has connected with it a flanged disk, $n$, supporting one end of an indicating device, $o$, (best shown in Fig. 2,) which may consist of a cylinder of paper or other light material having portions of its surface of different colors, as black and white, the edge of one colored portion forming a line which is spiral, or slightly inclined to the axis of the cylinder. The said indicating-cylinder $o$ is inclosed in a case, $p$, having an opening at one side provided with holders $p'$ for the co-operating member $r$ of the indicating mechanism, and a transparent cover, $t$, (see Fig. 4,) through which the indicating members may be observed, but which protects the said members from access of moisture, dust, and air, or other material to which the instrument may be exposed. The co-operating member $r$ of the indicating mechanism consists of a plate, preferably concave or curving toward the cylinder $o$, as shown in Fig. 4, provided with a longitudinal slot through which the said cylinder is visible, and the line thereon separating the different-colored portions crossing the said slot at an acute angle, as clearly shown in Fig. 1. Owing to the acuteness of the angle of intersection, a very slight lateral movement of the surface of the cylinder with relation to the co-operating member $r$ will produce a much greater movement of the point of intersection along the scale of the graduated edge of the plate $r$, and the point of intersection can be read with considerable nicety, there being less parallax than in the reading of the movable column of an ordinary mercurial or liquid thermometer.

In order to adjust the instrument so that the amount of movement of one end of the strip $a$ with relation to the other, produced by a given change in temperature, will cause a corresponding movement of the point of intersection of the members of the indicating mechanism on the scale, the length of the effective portion of the strip may be varied by loosening the screw $i$ and moving the end of the strip in the slot of the block $b$, and when the effective portion of the strip between the said block $b$ and the arm $k$ is found by experiment to be of proper length to produce the correct movement of the indicating device the end will be made fast in the block $b$ by turning up the screw $i$. The indicating device may then be set at the proper point to give the correct indication of a given temperature by loosening the screw $c$ and turning the block $b$ and connected strip $a$ and indicating device until the latter causes the point of intersection of the line on its surface with the graduated edge of the scale $r$ to be at the proper point for the temperature to which the strip is then exposed. This adjustment of the block $b$ on the pin $d$ may be made approximately, and then the final actual adjustment made without removing the cover $g$ by turning the case $p$ and connected member $r$ with relation to the base $f$ and other parts, the said case $p$ being fastened to the base $f$ by screws $u$, which pass through elongated holes $v$, (see Fig. 1,) to enable this latter adjustment to be made. The scale $r$ preferably has its edges flanged, as shown at $r'$ in Fig. 4, and is connected with the holders $p'$ by screws $r^2$, passing through slightly-elongated passages, to enable the said device $r$ to be adjusted slightly toward or from the cylinder $o$, in order to bring its edge as close as possible to the surface of the cylinder, and thus reduce the parallax in the reading at the point of intersection to a minimum.

I claim—

1. In an instrument for indicating changes of condition—such as temperature, pressure, &c.—the combination of a sensitive device capable of producing movement upon a change of condition to be indicated, and an indicating device consisting of a stationary member provided with a line or edge, and a movable member actuated by the said sensitive device, provided with a line or edge intersecting that of the stationary member, one of the said members being provided with graduations by which the position of the intersection of the said lines or edges may be read, substantially as described.

2. The combination of a sensitive device and an indicating-cylinder provided with a line or edge actuated thereby with a co-operating member having a line or edge, the lines or edges of the indicating members intersecting at an acute angle, and one of them being provided with graduations, substantially as and for the purpose described.

3. The combination, with an indicating device, of a sensitive strip connected at one end with the said indicating device, and a slotted block provided with an engaging-pin, $h$, and tapered screw $i$, holding the other end of the said strip, substantially as described.

4. The combination of the base $f$ and the sensitive device and indicating-cylinder with the inclosing-tube provided with the co-operating indicating member and adjustably connected with the said base, substantially as and for the purpose described.

5. The sensitive device and indicating-cylinder actuated thereby, combined with the inclosing-cylinder provided with holders, and the co-operating indicating member adjustably connected with the said holders, substantially as described.

In testimony whereof I have signed my name to this specification in the presence of two subscribing witnessess.

GEORGE B. ST. JOHN.

Witnesses:
JOS. P. LIVERMORE,
W. H. SIGSTON.